US 6,687,357 B1

(12) United States Patent
Sakaue et al.

(10) Patent No.: US 6,687,357 B1
(45) Date of Patent: Feb. 3, 2004

(54) ARBITRATION-TYPE CALL ESTABLISHING SYSTEM METHOD AND STORAGE MEDIUM

(75) Inventors: Yasuharu Sakaue, Kawasaki (JP); Koji Yamato, Kawasaki (JP); Hisaji Adachi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/382,511

(22) Filed: Aug. 25, 1999

(30) Foreign Application Priority Data

Aug. 28, 1998 (JP) .......................................... 10-243385

(51) Int. Cl.⁷ .......................... H04M 3/42; H04M 3/00; H04M 1/66; H04L 12/16; H04L 12/28
(52) U.S. Cl. .................. 379/202.01; 379/189; 379/199; 379/265.11; 370/261; 370/402
(58) Field of Search ................................ 370/402, 261; 379/265.11, 202.01, 188, 199

(56) References Cited

U.S. PATENT DOCUMENTS

| 4,860,347 | A | * | 8/1989 | Costello ..................... 379/199 |
| 5,448,630 | A | * | 9/1995 | Barstow ..................... 379/199 |
| 5,815,566 | A | * | 9/1998 | Ramot et al. ........... 379/265.11 |
| 5,864,613 | A | * | 1/1999 | Flood ......................... 379/188 |
| 6,298,045 | B1 | * | 10/2001 | Pang et al. ................. 370/261 |
| 6,356,554 | B1 | * | 3/2002 | Pickett et al. .............. 370/402 |

* cited by examiner

Primary Examiner—Ahmad F. Matar
Assistant Examiner—Thjuan P Knowlin
(74) Attorney, Agent, or Firm—Katten Muchin Zavis Rosenman

(57) ABSTRACT

An arbitration-type call establishing system comprising a plurality of user systems and a connection control system. The user systems each include means for transmitting the arbitration conditions including the desired other party to connect and the desired other party to permit a connection request, to a connection control system through a data network. The connection control system includes a reception processing unit for receiving the arbitration conditions, an information holding unit for holding for each user the user information constituting the personal information of users and the arbitration conditions, an arbitration processing unit for arbitrating between combinations of users satisfying the arbitration conditions while referring to the user information, and a connection execution unit for establishing a voice communication call between the user systems of the users established by arbitration in the arbitration processing unit, through a voice communication network, whereby an arbitration between the intentions of the two user parties can be performed in such a manner as to accurately reflect the intention of the users to be connected.

34 Claims, 16 Drawing Sheets

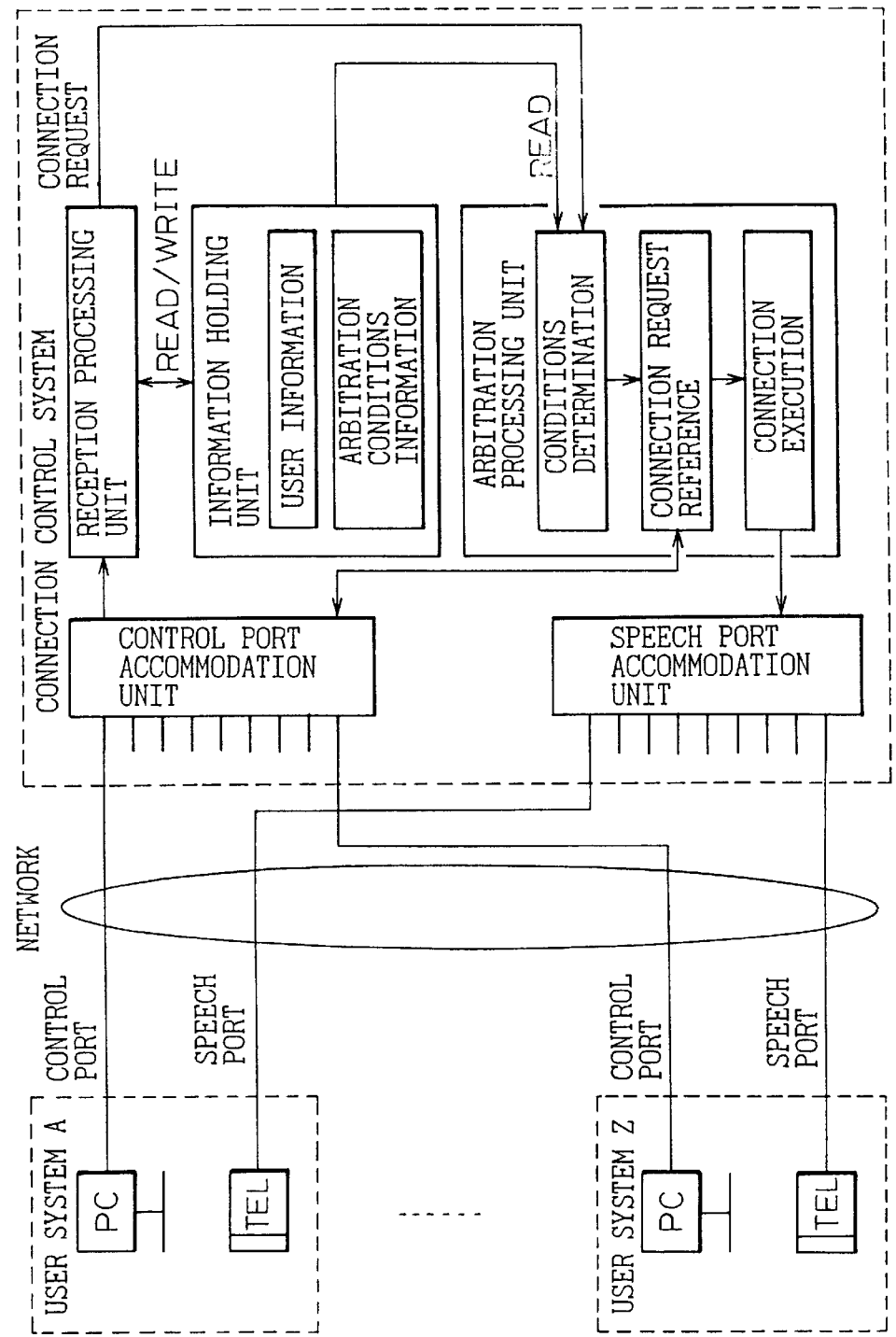

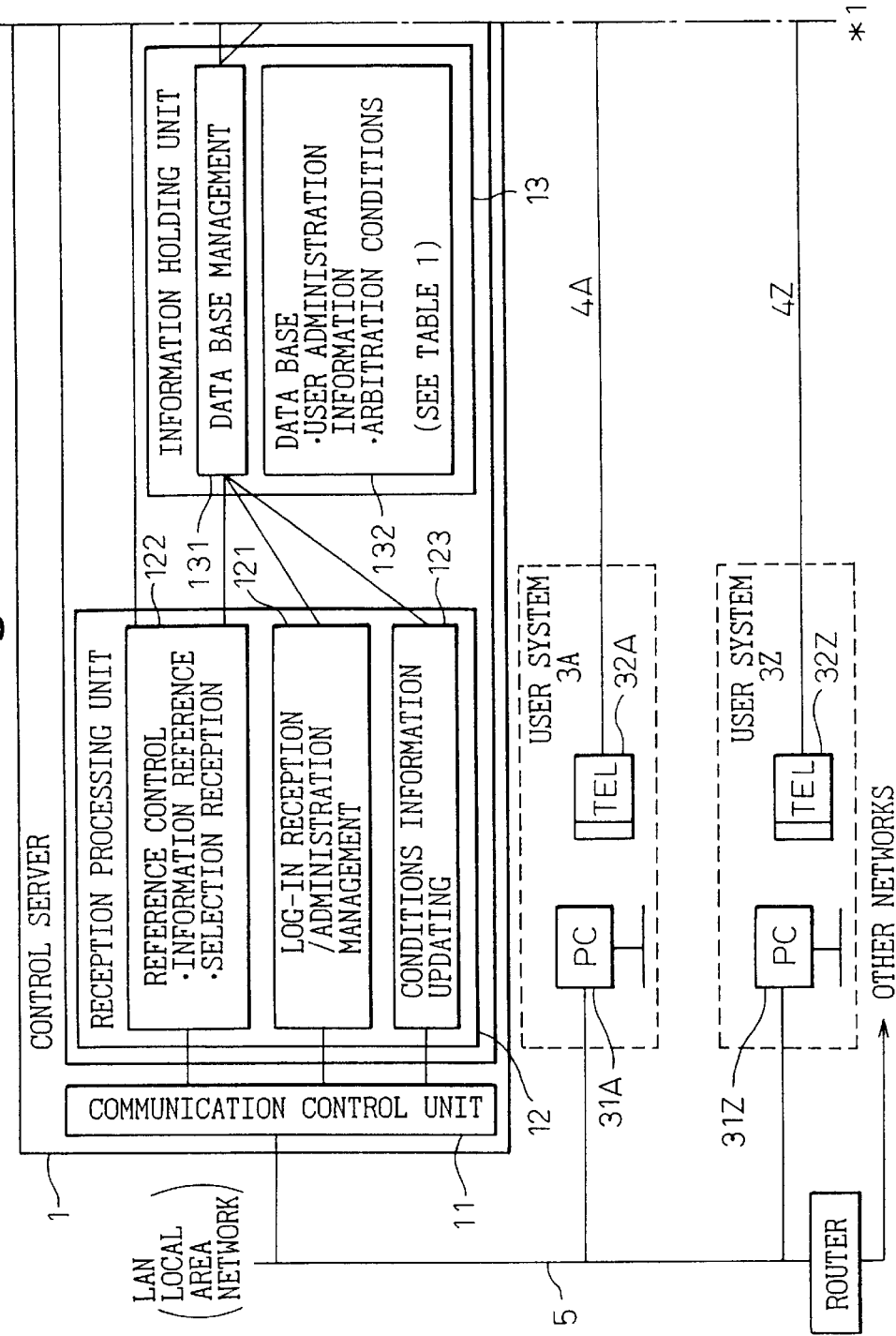

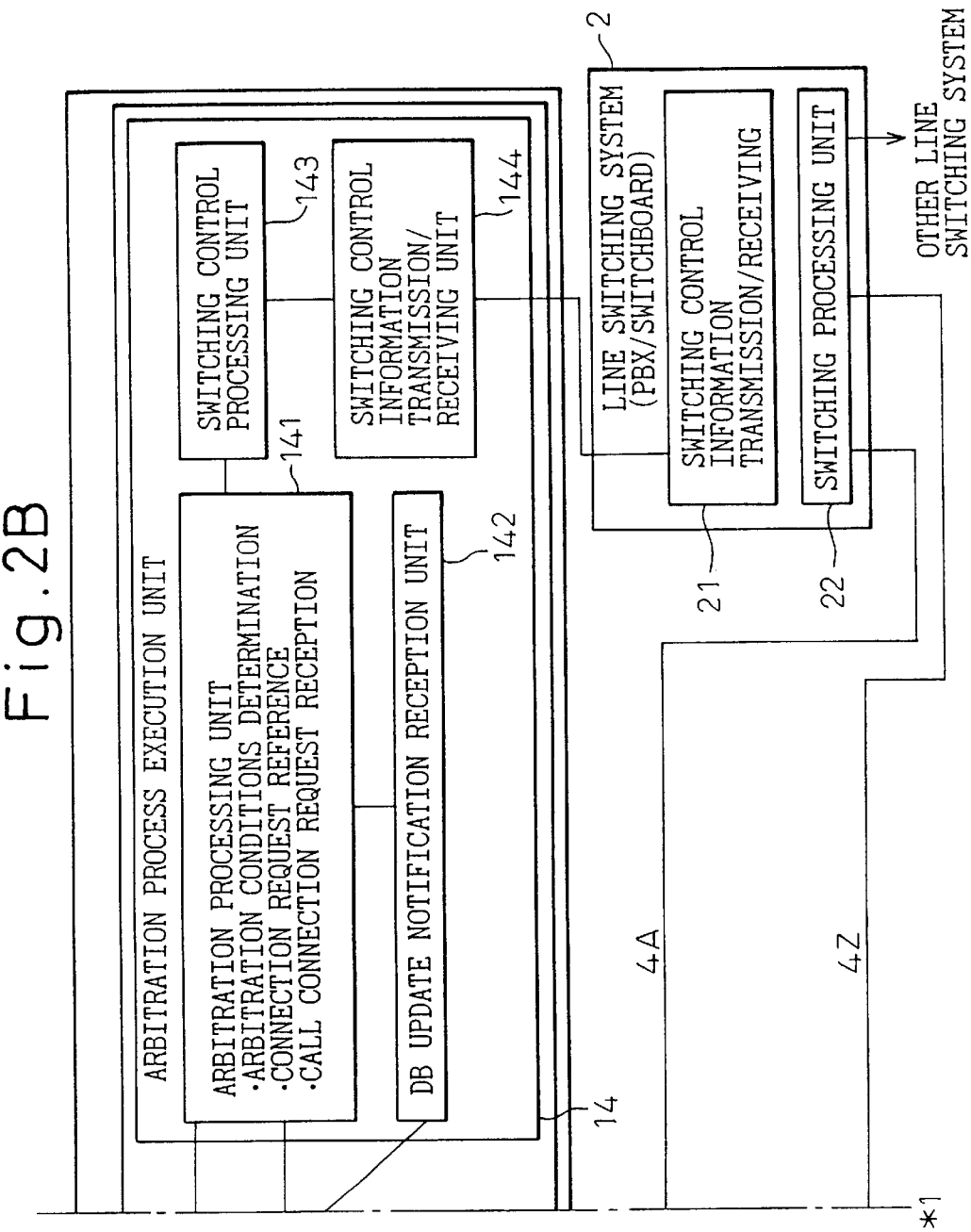

Fig. 3

| ID | USER INFORMATION ||||| ARBITRATION INFORMATION || STATUS |
|---|---|---|---|---|---|---|---|---|
| | NAME | OCCUPATION | AGE | HOBBY | PHOTO | OUTGOING CONDITIONS | INCOMING CONDITIONS | |
| 990001 | FUJITSU, TARO | PHYSICIAN | 32 | SPORTS | 990001.bmp | HOBBY OF RECEIVER: SPORTS | — | LOGGED IN |
| 990002 | FUJITSU, JIRO | ATTORNEY OF LAW | 30 | DRIVING VEHICLES | 990002.bmp | — | — | LOGGED OFF |
| 990003 | TANAKA, HANA | TEACHER | 31 | SPORTS | 990003.bmp | — | OCCUPATION OF TRANSMITTER: PHYSICIAN | SPEAKING |
| | | | | | | | | |

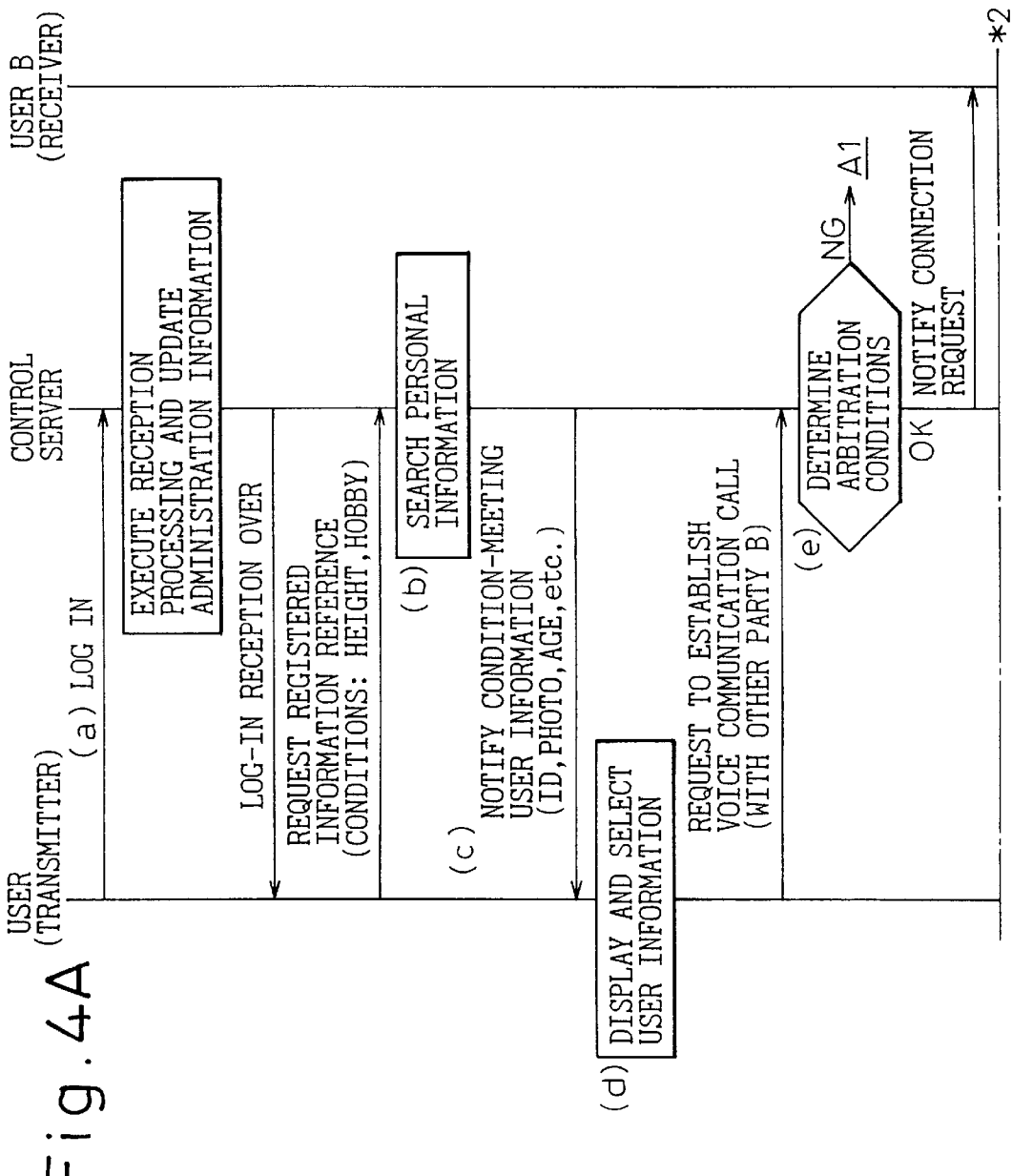

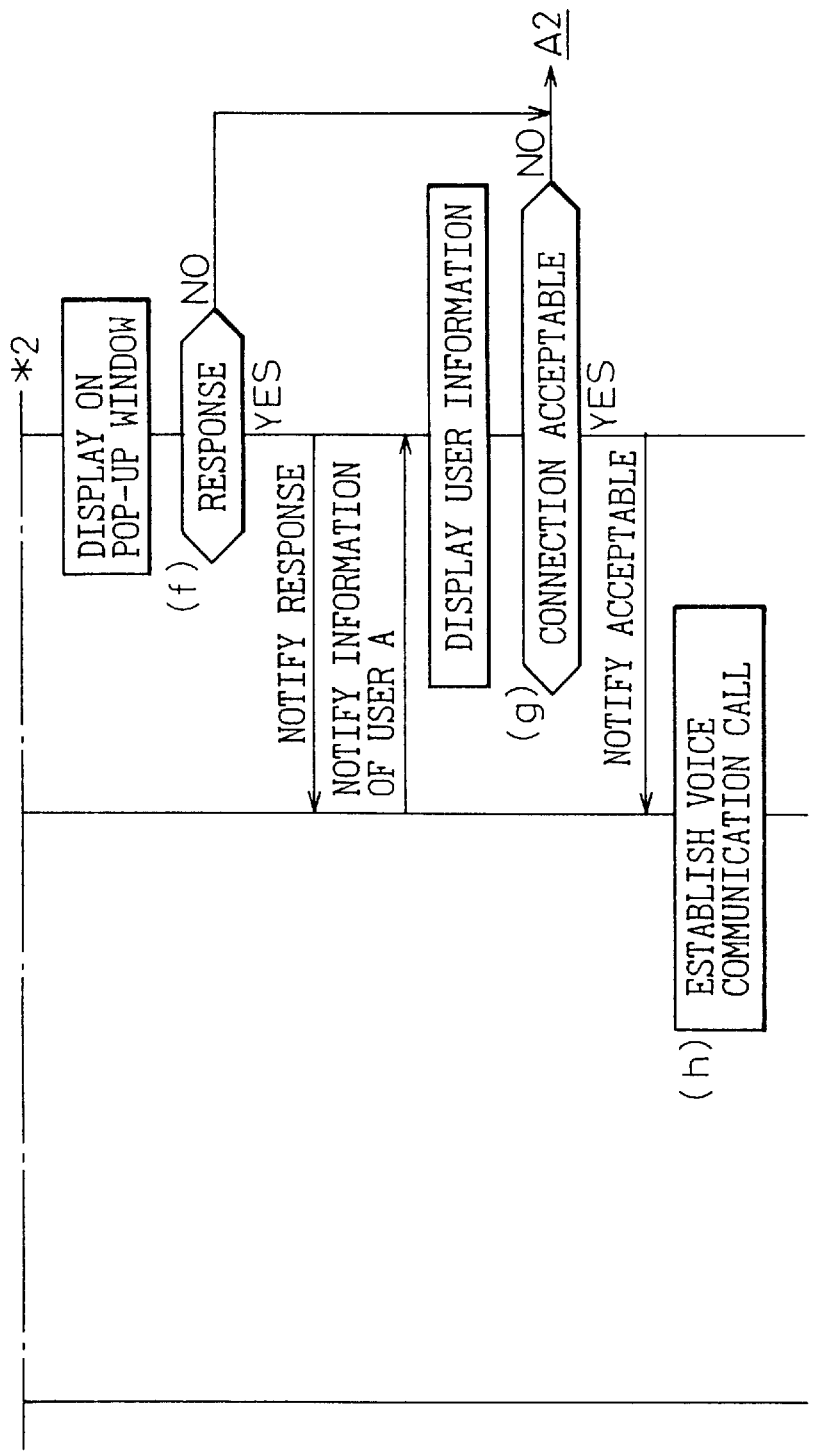

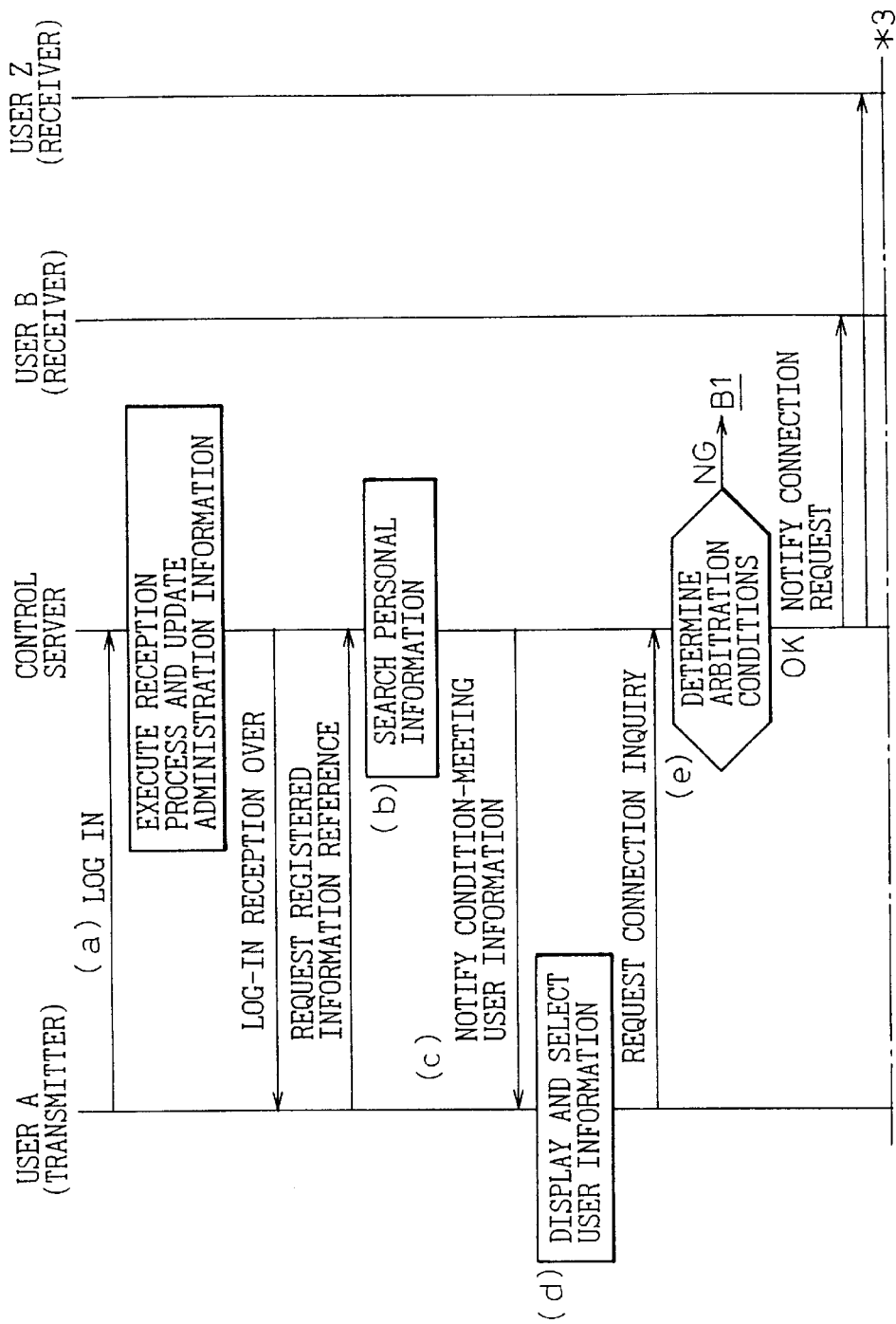

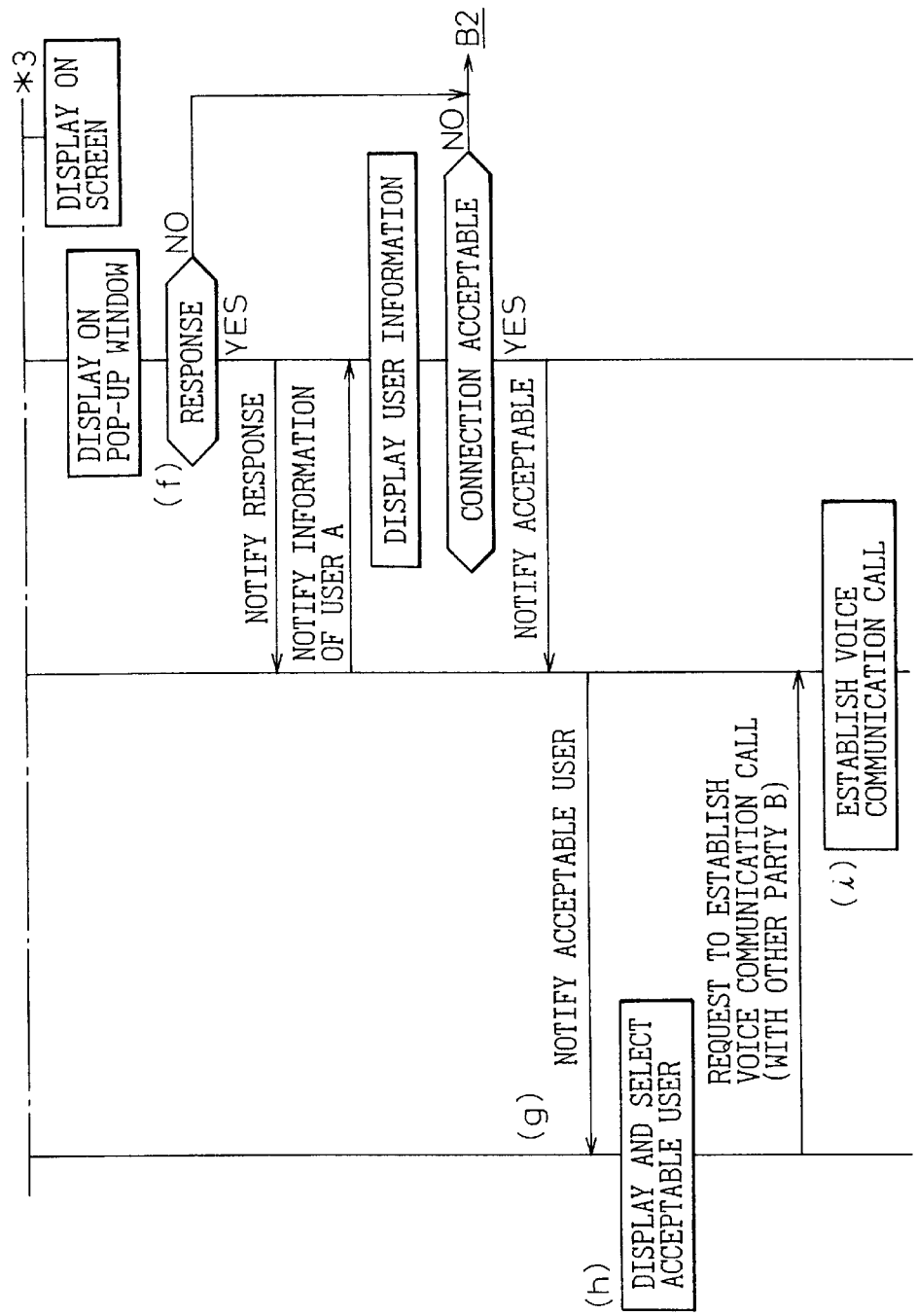

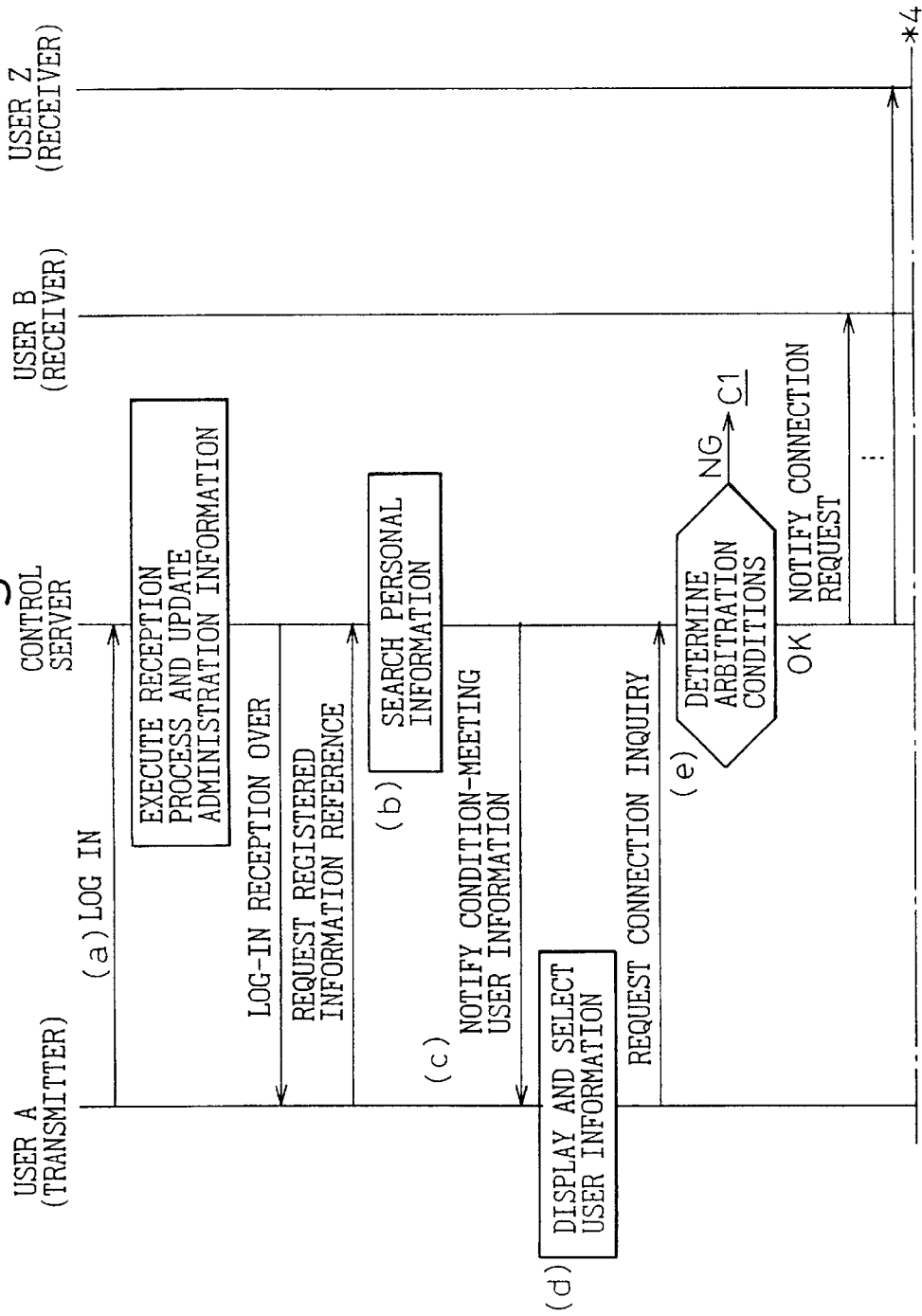

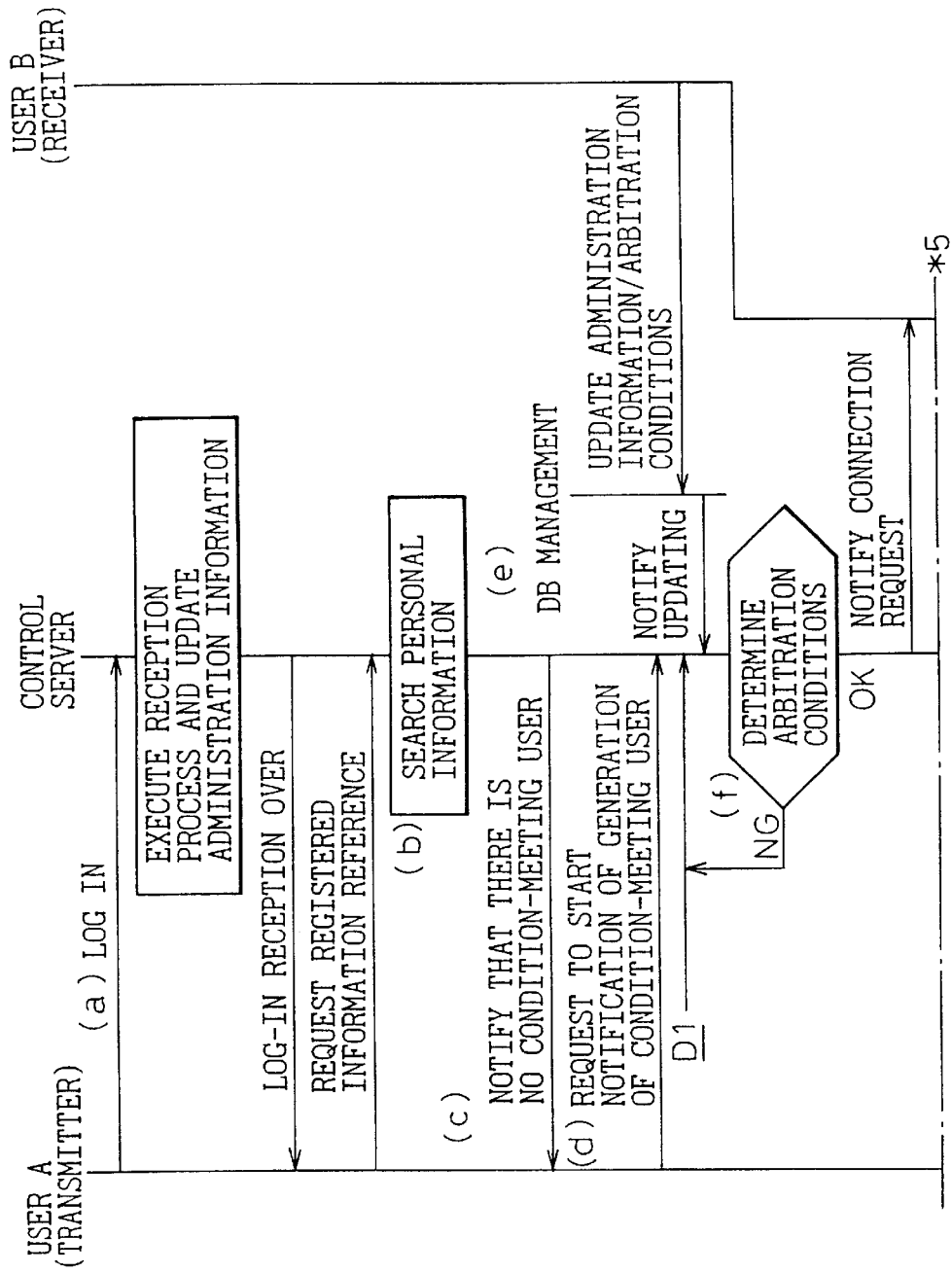

ARBITRATION-TYPE CALL ESTABLISHING SYSTEM METHOD AND STORAGE MEDIUM

BACKGROUND OF THE INVENTION

1. Field of the Invention

The present invention relates to an arbitration-type call establishing system, a method, and a storage medium, for arbitrating the connecting conditions for each of the system users and establishing a voice call between parties who have satisfied the conditions.

2. Description of the Related Art

In a conventional exchange, a system is known which determines whether a given voice speech call (hereinafter called also the voice communication call) is to be connected or not, and connects only the voice calls which are permitted. As an example of such a system, take an important telephone terminal (hereinafter called the VIP terminal). The voice calls that can reach the particular VIP terminal are limited to those from specific parties but, on the other hand, transmission may reach any party from the VIP terminal. As another example only a specific extension can be connected to the office line in a private branch exchange but other extensions cannot be connected to the office line.

The conventional voice call establishing system described above, however, does not necessarily reflect the intention of each party to be connected. From the viewpoint of the receiver, for example, a voice call from a person (calling party) with which the connection is not desired, reaches the receiver, or from the viewpoint of the transmitter, a voice call reaches the wrong person (called party).

SUMMARY OF THE INVENTION

Accordingly, an object of the present invention is to provide an arbitration-type call establishing system in which a voice call can be connected while arbitrating between the intentions of the two parties in such a manner as to accurately reflect the intention of the users to be connected.

FIG. 1 is a diagram for explaining the principle of the present invention.

In order to solve the problem described above, according to the present invention, there is provided an arbitration-type call establishing system including a plurality of user systems each having a data communication function and a voice speech function, and a connection control system connected to the user systems through a data network and a voice communication network, the user systems each comprising means for transmitting, to the connection control system through the data network, outgoing conditions for defining parties to which connection requests are to be given and incoming conditions for defining parties from which connection requests are to be permitted, and the connection control system comprising a reception processing unit for receiving the outgoing conditions and the incoming conditions from the user systems, an information holding unit for holding for each user, user information constituting personal information of the user, and arbitration conditions including the outgoing conditions and the incoming conditions received by the reception processing unit, an arbitration processing unit for arbitrating between a combination of the users satisfying the arbitration conditions with reference to the user information, and a connection execution unit for forming, through the voice communication network, a voice communication call between the user systems of the users established as a result of the arbitration in the arbitration processing unit.

In this arbitration-type call establishing system, the arbitration processing unit of the connection control system arbitrates between a combination of users satisfying the arbitration conditions while referring to the user information in accordance with the outgoing conditions and the incoming conditions registered by the user, and the connection execution unit forms, through the voice communication network, a voice communication call between the user systems of the users established as a result of the arbitration.

This reception processing unit can be configured to have information updating means for updating the user information or the arbitration conditions information held in the information holding unit based on changed control information input from the user systems through the data network.

As a result, in the case where the arbitration fails under the arbitration conditions set in advance, for example, the users can modify the particular arbitration conditions.

In the arbitration-type call establishing system described above, the user systems each include means for transmitting a reference request indicating the outgoing conditions to the connection control system, displaying means for displaying the user information of one or more condition-satisfying users notified from the connection control system in response to the reference request, and selecting means for selecting the desired other party from among the condition-satisfying users displayed and notifying the connection control system of the selected party through the data network. The connection control system includes searching means for searching for a user satisfying the outgoing conditions in response to a reference request from the transmitting user systems based on the user information of the information holding unit, and notification means for notifying, through the data network, the transmitting user system of the user information of the condition-satisfying users searched for by the searching means. The arbitration processing unit can be configured in such a manner that the arbitration process is possible with the condition-satisfying users selected and notified by the transmitting user system.

As a result, the transmitting user can acquire and check the user information of the users satisfying the outgoing conditions registered by the transmitting user and thus can select the other party to speak with. The connection control system arbitrates with the selected other party, and the reference to the user information eliminates the case in which a voice call is established with the other party with which a conversation is not required. In this way, the arbitration is accomplished very efficiently.

The selecting means described above can be configured to transmit to the connection control system a voice communication call establishing request for establishing a voice communication call with a desired party in the condition-satisfying users notified.

As a result, the connection control system can immediately arbitrate in the possibility, on the part of the transmitting user, of establishing a voice communication call with the desired other party.

As an alternative, the selecting means described above can be configured in such a manner that if there is any party or parties with which conversation is desired in the condition-satisfying users notified, an inquiry request is transmitted to the connection control system for permission of establishing a voice communication call with the desired other party (parties).

In this way, the transmitting user can make an inquiry to a plurality of other parties, at one time, as to whether they are willing to speak with the transmitting user.

Also, the arbitration processing unit described above can be configured to arbitrate in the advisability of establishing a voice communication call with reference to the incoming conditions of the condition-satisfying users based on the select information of the condition-satisfying users selected as the other parties by the transmitting user system.

As a result, the case of arbitration in which the incoming conditions set by the other party fail to be met, is eliminated.

Alternatively, the arbitration processing unit described above can be configured in such a manner that only the users satisfying the incoming conditions are searched for by the searching means as condition-satisfying users with reference to the incoming conditions of the users, and the transmitting user system is notified.

As a result, at the time of searching for the condition-satisfying users, the other parties whose incoming conditions fail to coincide with the personal information of the transmitting user are removed from the category of the condition-satisfying users in advance, and therefore the arbitration can be performed efficiently.

As another alternative, the arbitration processing unit described above can be configured in such a manner that, in response to the notification of the selected information of the condition-satisfying users from the transmitting user system, an inquiry is made for permission to connect to the selected condition-satisfying users and an arbitration is conducted only with the users who have answered "acceptable".

As a result, arbitration is avoided with the other parties who are not willing to permit conversation with the transmitting user.

As still another alternative, the arbitration processing unit can be configured in such a manner that in the inquiry for permission of connection, the user information of the transmitting user is submitted to the selected condition-satisfying users.

As a result, the other parties can select whether to speak with a transmitting user by referring to the personal information of the transmitting user. As As a further alternative, the arbitration processing unit can be configured in such a manner that in making an inquiry for permission of connection, the user information of the transmitting user is submitted only to the users confirmed to be willing to respond among the selected condition-satisfying users.

As a result, the personal information of the transmitting user can be submitted only to the other parties willing to respond.

As a still further alternative, the arbitration processing unit can be configured in such a manner that in making an inquiry for permission to connect, the willingness to respond of the selected condition-satisfying users is notified to the transmitting user and the user information of the transmitting user is transmitted by the transmitting user only to the selected ones of the condition-satisfying users willing to respond.

As a result, the situation can be avoided in which the voice call fails to be established for a given called party in spite of the permission given for accepting the speech by referring to the personal information of the transmitting user.

As still another alternative, the arbitration processing unit can be configured to select the users of whom the arbitration conditions coincide with those of the transmitting user when the information of the information holding unit is updated periodically or arbitrarily in compliance with the request of the transmitting user who has registered the outgoing conditions.

As a result, even in the case where there is no called party satisfying the arbitration conditions when the outgoing conditions are registered by the transmitting user, the other party can be selected who subsequently participates in the arbitration-type call establishing system and meets the arbitration conditions or who changes the arbitration conditions.

According to another aspect of the present invention, there an arbitration-type call establishing method is provided.

According to still another aspect of the present invention, there is provided a storage medium for storing a program for executing the arbitration-type call establishing method.

The above object and features of the present invention will be more apparent from the following description of the preferred embodiments when read with reference to the accompanying drawings, wherein:

BRIEF DESCRIPTION OF THE DRAWINGS

FIG. 1 is a diagram for explaining the principle of the invention;

FIG. 2A and FIG. 2B are diagrams showing a system configuration in the case where an arbitration-type call establishing system is realized as an interview-for-marriage system according to an embodiment of the invention;

FIG. 3 is a diagram showing an example of the information registered in the data base according to an embodiment of the invention;

FIG. 4A and FIG. 4B are sequence diagrams (1/2) for explaining an operation example (1) according to an embodiment of the invention;

FIG. 6A and FIG. 6B are sequence diagrams (1/2) for explaining an operation example (2) according to an embodiment of the invention;

FIG. 8A and FIG. 8B are sequence diagrams (1/2) for explaining an operation example (3) according to an embodiment of the invention;

FIG. 10A and FIG. 10B are sequence diagrams (1/2) for explaining an operation example (4) according to an embodiment of the invention.

DESCRIPTION OF THE PREFERRED EMBODIMENTS

Figure 5:
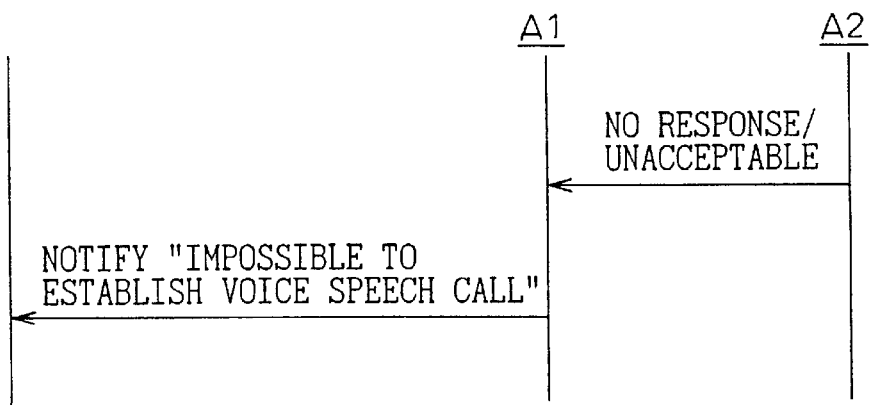
FIG. 5 is a sequence diagram (2/2) for explaining an operation example (1) according to an embodiment of the invention.

Embodiments of the invention will be explained with reference to the drawings below.

FIG. 2A and FIG. 2B show an arbitration-type call establishing system according to an embodiment of the present invention. This arbitration-type call establishing system embodies the invention as what is called an interview-for-marriage system utilizing the communication terminals. This interview system can be installed in a marriage agent's office visited by a plurality of customers, that is, users. In this interview system, a plurality of customers (users) are each seated before a terminal called a user system and input the desired conditions for the other party through the terminals, so that the system searches out a suitable other party while adjusting the mutual conditions and the users for which the arbitration is successful can have a conversation with each other by telephone.

In FIGS. 2A and 2B, reference symbols 3A to 3Z designate user systems occupied by system users. The user systems 3A to 3Z include personal computers 31A to 31Z constituting data communication terminals and telephone terminals 32A to 32z for voice communication. In the user systems 3A to 3Z, the personal computers 31A to 31Z are each connected to a data network including a LAN (local area network) 5 through a control port. The telephone terminals 32A to 32Z, on the other hand, are connected to a voice communication network including telephone lines 4A to 4Z through a speech port.

Numeral 1 designates a control server configured of a personal computer or a work station. Numeral 2 a line switching system provided as a member separate from the control server 1 in the case where it is configured of a PBX (private branch exchange). The line switching system 2 is built in the control server 1 in the case where it is configured of a switch board. The control server 1 encases therein the LAN 5 for data communication. The line switching system 2 accommodates both the telephone lines 4A to 4Z and other line switching systems, between which the voice communication can be switched for connection.

The control server 1 includes a communication control unit 11 constituting an interface with the LAN 5, a reception processing unit 12, an information holding unit 13 and an arbitration processing execution unit 14.

The communication control unit 11 performs data communication with the user systems 3A to 3Z through the LAN 5 for transmitting and receiving various required control data and messages.

The reception processing unit 12 is a part for receiving and processing various messages from the user systems 3A to 3Z and includes a log-in reception/administration management unit 121, a reference control unit 122 and a conditions information updating unit 123. The log-in reception/administration management unit 121 receives a log-in notification from the user systems 3A to 3Z and manages the administration of the log-in state of the user systems 3A to 3Z. The administration of the user systems is managed in a data base 132 of the information holding unit 13 described later.

The reference control unit 122 receives a request for referencing registered information, a connection inquiry request with select information, a voice communication call establishment request, etc. from the user systems 3A to 3Z, and requests the arbitration processing execution unit 14 to process them. The operation of this part will be described in detail later. The conditions information updating unit 123 is a part for receiving a request to change or update the registered information from the user systems 3A to 3Z and requesting the data base management unit 131 to update the contents of the data base 132 of the information holding unit 13.

The information holding unit 13 is a part for storing and holding the various data, and includes a data base 132 and a data base management unit 131 for managing the registration and updating of the contents of the data base 132. The data base includes the user administration information and the arbitration conditions information.

FIG. 3 shows an example of the data base. The user administration information includes the user information and the administration information, i.e., status. The user information is the personal information of each user and has registered the name, occupation, age, hobby, photo data, etc. for each user ID. The administration information, i.e., status indicates whether the user involved has logged in or is in a log-off state in the arbitration-type call establishing system through the user system or speaking on the telephone terminal. The contents of the user information may be registered by the users themselves through the user systems 3A to 3Z. Instead, the manager of the arbitration-type call establishing system may register the contents. Also, the contents of the administration information are managed in accordance with the log-in information or the like input through the LAN 5 from the user systems 3A to 3Z.

The arbitration conditions information includes the outgoing conditions and the incoming conditions. The arbitration conditions of each user are registered appropriately from the user system of the particular user. The outgoing conditions are for defining the other parties to whom the user of the user system requesting the connection for speech (hereinafter called the transmitting user) desires to propose the conversation (connection request). The incoming conditions, on the other hand, are for defining the parties from whom the application for speech (connection request) is permitted. For example, the conditions are limited in such a manner that a conversation proposal only from a transmitter (the other party of speech) whose occupation is physician can be accepted.

The arbitration process execution unit 14 includes an arbitration processing unit 141, a data base update notification receiving unit 142, a switching control processing unit 143 and a switching control information transmission/receiving unit 144. The arbitration processing unit 141 determines the arbitration conditions (conditions for connection such as outgoing conditions/incoming conditions) of the transmitting user and the receiving user with reference to the data base 132 or otherwise processes the determination of the arbitration conditions, searches for a user satisfying the outgoing conditions registered by the transmitting user in response to the request from the transmitting user for referencing the registered user information or otherwise processes the reference for the connection request, and arbitrates between the advisability of the receiving user accepting the connection inquiry and request or the request for establishing the voice communication from the transmitting user or otherwise processes the reception of the call connection request.

The data base update notification processing unit 142 is a part for receiving the update request notification from the arbitration processing unit 141 and requesting the data base management unit 131 to update the data base 132.

The switching control processing unit 143 controls the switching and connection of the voice communication call between the user systems of the users between whom the arbitration is established, in compliance with the request of the arbitration processing unit 141 to establish the voice communication call between the particular users.

The line switching system 2 includes a switching control information transmission/receiving unit 21 and a switching processing unit 22. The switching control information transmission/receiving unit 21 transmits the switching control information to and receives it from the control server 1. The switching processing unit 22 is for switching and connecting the telephone line between the telephone terminals of the users between whom the arbitration is established, based on the switching control information received by the switching control information transmission/receiving unit 21.

Several examples of the arbitration operation of the arbitration-type call establishing system will be described below.

(1) First, with reference to FIGS. 4A, 4B, and 5, an explanation will be given of an operation example (1) representing a case in which a voice communication call is established with a specific party, i.e., a user B, based on the outgoing conditions registered by a user A, i.e., a transmitting end.

(a) When the user A logs in from the user system 3A, the control server 1 receives the log-in at the reception processing unit 12, updates the administration information of the data base, and notifies the user A with a message "log-in reception over". Then, the user A indicates the outgoing conditions (the conditions of the other party, for example, the height is 175 cm or more, and the hobby is sports), and makes a "reference request" for the registered user information coinciding with the particular outgoing conditions. The control server 1 registers the outgoing conditions in the data base and processes the reference request for the user information listing a registrant satisfying the outgoing conditions.

(b) In processing the reference request, the reception processing unit 12 searches the personal information (user information) of the users registered in the data base and extracts a logged-in user satisfying the outgoing conditions.

(c) Then, the information (registered ID, portrait, age, etc.) of the user extracted is notified to the user A as the "condition-satisfying user information". At the same time, in the event that the user information of the transmitting user A fails to coincide with the incoming conditions registered by the user at the receiving end, then the particular user information at the receiving end may not be notified to the user A.

(d) In the user system 3A, upon receipt of the "condition-satisfying user information", the contents thereof are displayed on the screen of the personal computer 31A. The user A checks the user information notified to him, selects a specific person, if any, whom he/she wants to have a conversation (the user B, for example), and gives a "voice speech call establishing request (with other party B)" specifying the user B to the control server 1.

(e) In the control server 1, based on the "voice speech call establishing request (with other party B)" from the user A, the arbitration process execution unit 14 checks the incoming conditions (arbitration conditions) of the user B and determines whether the user A satisfies the incoming conditions of the user B. In the case where the user A fails to satisfy the incoming conditions of the user B, the user A is notified of the message "impossible to establish voice speech call". In the case where the user A satisfies the incoming conditions of the user B, on the other hand, the user system 3B of the user B is notified, through the LAN 5, of a connection request from the user A, and the user B is notified, by the pop-up window or the notification sound on the screen of the personal computer 31B, that there is a connection request for the voice call from the user A.

(f) If the user B checking this notification is not willing to respond, he/she sends a no-response notification to the control server 1, whereupon the control server 1 notifies the user system 3A of the user A of the message "impossible to establish voice speech call".

In the case where the user B makes a response with the intention of knowing the details of the connection request, on the other hand, a response notification is sent from the user system 3B to the control server 1. The control server 1, upon receipt of this response notification, notifies the user information of the user A (registered ID, portrait, age, etc.) to the user system 3B of the user B.

(g) In the user system 3B of the user B, the user information of the user A which may be notified thereto is displayed on the personal computer. The user B checking this user information decides whether to accept the voice call connection request from the user A or not, and then gives a notice "acceptable" or "not acceptable" through the user system 3B to the arbitration process execution unit 14 of the control server 1.

(h) In the case where the notification from the user B is "acceptable", the arbitration process execution unit 14 gives an instruction for connection to the line switching system 2 through the switching control processing unit 143 in order to establish a voice communication call. The line switching system 2 establishes a speech path by the telephone terminals 32A, 32B between the users A and B.

In the case where the notification from the user B is "not acceptable", on the other hand, the control server 1 gives a notice "impossible to establish voice speech call" to the user A through the LAN 5.

Figure 7:
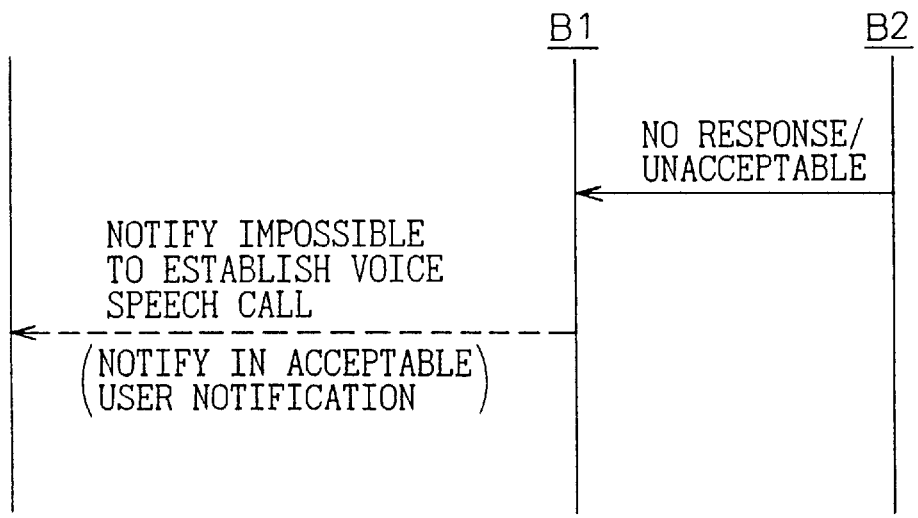
FIG. 7 is a sequence diagram (2/2) for explaining an operation example (2) according to an embodiment of the invention.

(2) Now, an operation example (2) of the arbitration-type call establishing system will be explained with reference to FIGS. 6A, 6B, and 7. This operation example (2) represents the case in which a request to establish a voice speech call is given to a plurality of parties based on the outgoing conditions registered by the user A, i.e., the transmitting end.

(a) As in step (a) of the operation example (1) described above, the user A logs in the system, and the control server 1 makes a reference request for the registrant information according to the outgoing conditions (the conditions for other party, such as, the height is 175 cm or more, hobby is sports) in registration.

(b) As in step (b) of the operation example (1) described above, the reception processing unit searches the personal information of the users registered in the data base, and extracts the users who have logged in or all the users (regardless of log-in or log-off) satisfying the outgoing conditions.

(c) As in step (c) of the operation example (1) described above, the user information (registered ID, portrait, age, etc.) of the users extracted is notified to the user A as the "condition-satisfying user information". In the process, in the case where the personal information of the user A fails to coincide with the incoming conditions of the receiving users, the user information at the receiving end may not be notified to the user A.

(d) In the case where there is at least a user who wants to propose the conversation among the condition-satisfying users notified, the user A selects one or more such users (or all the users) and sends the "connection inquiry request" to the control server 1. This "connection inquiry request" is for making an inquiry of the other party user of the willingness to accept the proposal for conversation from the user A.

(e) In response to the "connection inquiry request" from the user A, the arbitration process execution unit 14 of the control server 1 checks the incoming conditions of the users selected by the "connection inquiry request" to determine whether the user A meets the particular incoming conditions or not. The names of the selected users whose incoming conditions fail to meet the user A are expressly notified to the user A together with the notice "impossible to establish voice speech call".

As to the users whose incoming conditions meet the user A, on the other hand, the arbitration process execution unit 14 notifies the voice call connection request from the user A by means of the pop-up window or the notification sound at the same time on the personal computers of all the users whose incoming conditions meet the user A through the LAN 5.

(f) The users who have received the notification return a response to the control server 1, the user information (registered ID, portrait, age, etc.) of the transmitting user A is notified from the control server 1 to the particular users who have returned the response. The users, upon receipt of the user information, check the user information and decide whether to accept the voice call connection request of the user A or not, and sends an "acceptable" notice or a "not acceptable" notice to the control server 1.

(g) In the case where a user gives a notice "acceptable", the control server 1 sends the notice "acceptable user" with the name of the accepting user to the user A. In the case where a user gives a notice "not acceptable", on the other hand, the "unacceptable user" notice included in the "acceptable user" notice is given to the user A. In the case where the "acceptable" notice is given by one or a plurality of users, therefore, the information of the users is given to the user A. In the case where all the users want to give the "unacceptable" notice, the user A is notified through the LAN 5.

(h) The user A of the user system 3A, upon selection of the desired party (the user B in this case) for forming the voice speech call (i.e. proposal for conversation) from among the users who have notified "acceptable", sends a "voice speech call establishing request (with the other party B)" specifying the other party to the control server 1. The control server 1, upon receipt of the "voice speech call establishing request (with the other party B)", establishes a speech path by the telephone terminals between the users A and B through the switching control processing unit 143 and the line switching system 2.

Figure 8B:
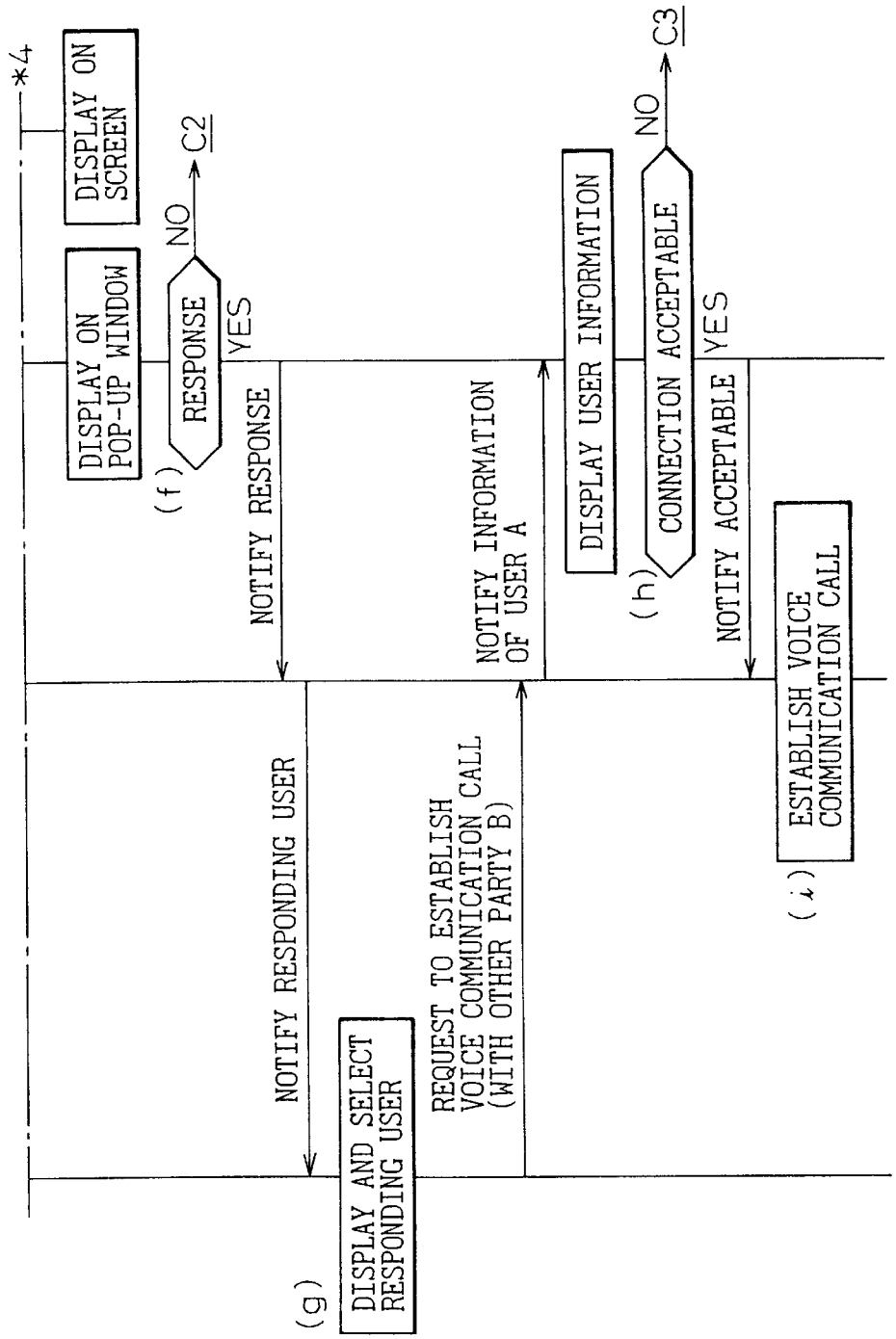
Figure 9:
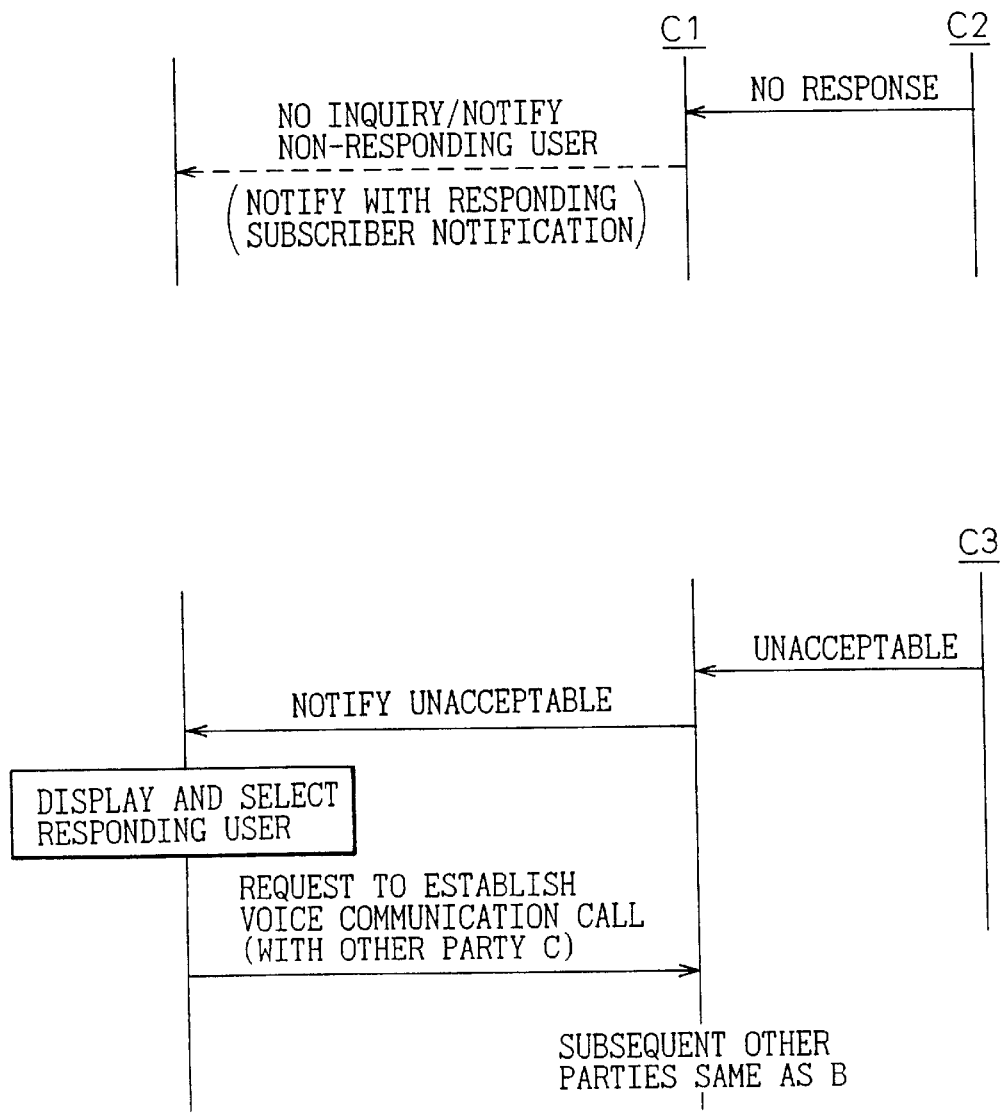
FIG. 9 is a sequence diagram (2/2) for explaining an operation example (3) according to an embodiment of the invention.

(3) Now, an operation example (3) of the arbitration-type call establishing system will be explained with reference to FIGS. 8A, 8B and 9. This operation example (3) represents the case in which a voice communication call establishing request is sent to a plurality of parties based on the outgoing conditions registered by the user A at the transmitting end.

(a) to (e): These steps are the same as steps (a) to (e) in the operation example (2) above.

(f) In the case where the user who has received the notification of connection request from the user A gives a response notification to the control server 1, the control server 1 notifies the user A of the name of the user who has responded, through the LAN 5. In the case where no one has responded, on the other hand, the user A is notified through the LAN 5.

(g) The user A, upon selection of the party with whom he/she wants to establish the voice communication call (the user B in this case), sends the "voice speech call establishing request (the other party B)" to the control server 1 designating the user B as the desired other party. The control server 1, upon receipt of the "voice speech call establishing request (the other party B)", sends the user information (registered ID, portrait, age, etc.) of the user A to the user B.

(h) The user B who has received the notice checks the user information of the user A, decides whether the voice call connection request from the user A is to be accepted or not, and gives the notice "acceptable" or the notice "not acceptable" to the arbitration process execution unit 14.

(i) In the case where the notification from the condition-satisfying user B is "acceptable", the arbitration process execution unit 14 establishes a speech path by requesting the line switching system 2 for connection through the switching control processing unit 143 in order to establish a voice communication call between the user A and the user B.

In the case where the notification from the user B is "not acceptable", on the other hand, the control server 1 notifies the user A of the fact ("unacceptable notice") through the LAN 5. If there are other users who have responded in step (g) above and whom the user A wants to propose for conversation, the user A can try to establish a voice communication call by following steps (g) to (i) described above.

Figure 10B:
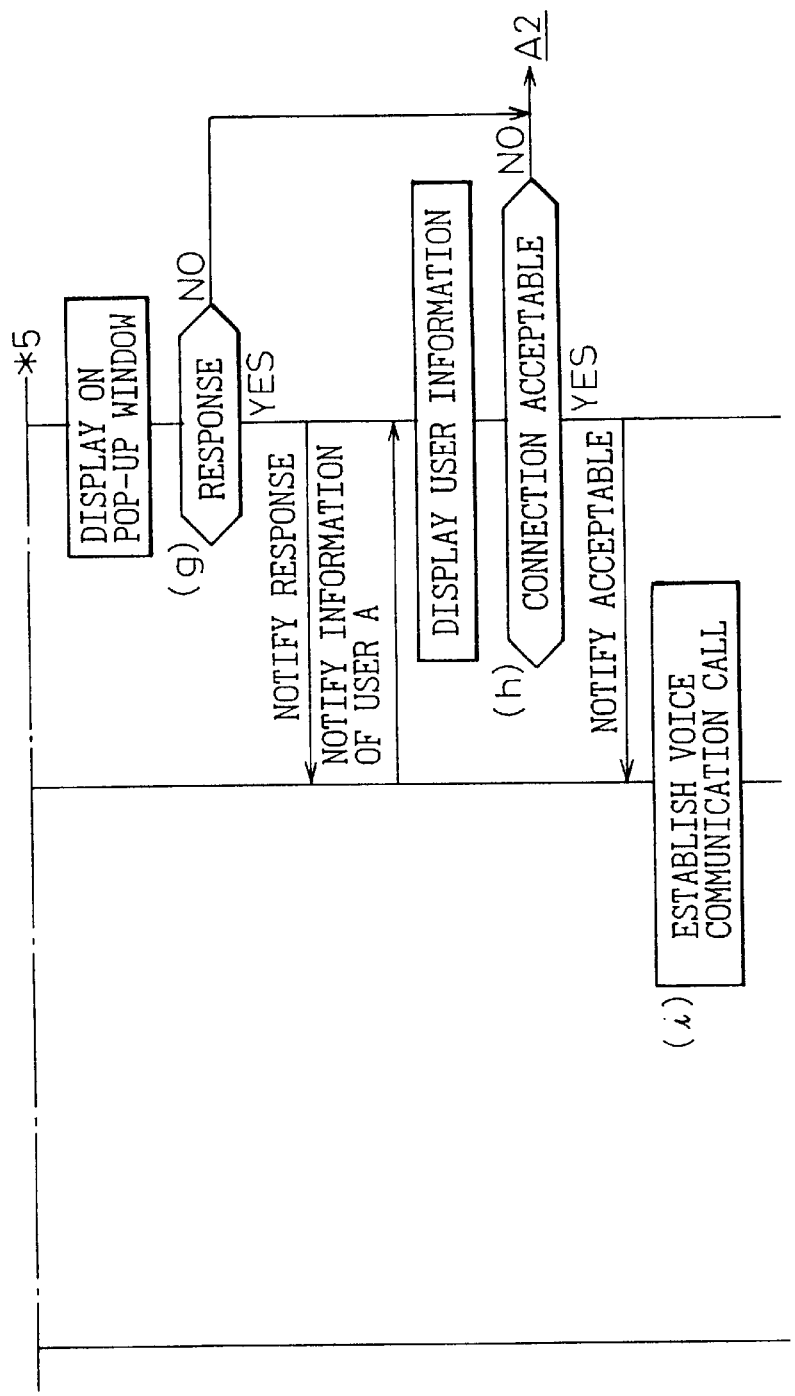
Figure 11:
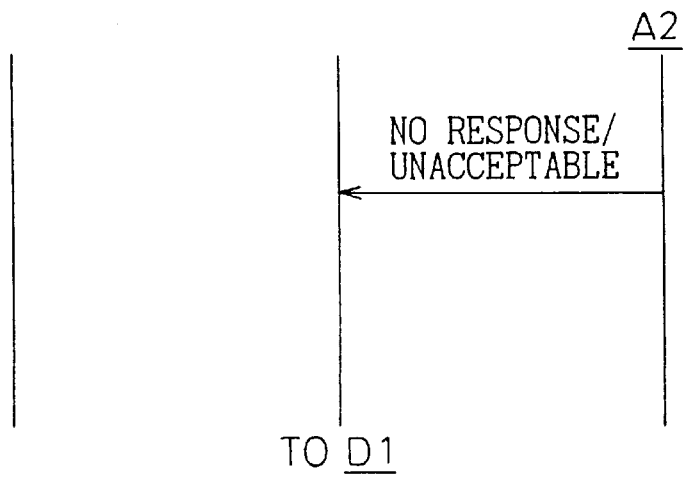
FIG. 11 is a sequence diagram (2/2) for explaining an operation example (4) according to an embodiment of the invention.

(4) Now, an operation example (4) of the arbitration-type call establishing system will be explained with reference to FIGS. 10A, 10B and 11. This operation example (4) represents the case in which even in the absence of a user satisfying the arbitration conditions based on the outgoing conditions registered in advance by the user A (transmitting end), the user A is notified when the arbitration conditions come to be met by a new user who has subsequently logged in or by the change of the arbitration conditions of the existing users, and then a request is issued to establish a voice communication call based on the notification.

(a): As in step (a) of the operation example (1) described above, the user A logs in the arbitration-type call establishing system from the user system 3A, and makes a reference request for the registrant information in accordance with the outgoing conditions (the conditions of the other party such as the height is 175 cm or taller and the hobby is sports) in registration. The control server 1 processes the reception corresponding to the reference request.

(b): As in step (b) of the operation example (1) described above, the reception processing unit 12 searches the personal information (user information) of the users registered in the data base for the users who has logged in satisfying the outgoing conditions.

(c) In the case where the search shows there is no user satisfying the outgoing conditions, the control server 1 notifies the user A that there is "no information on a user satisfying the conditions". Also in the case where the user information of the transmitting user A fails to meet the incoming conditions registered by the receiving user, the determination may be "no information on a user satisfying the conditions".

(d) The user A who has received the "no information of user satisfying the conditions" notice may wait for the appearance of a user satisfying the outgoing conditions as a new user logs in or the users who have logged in change the arbitration conditions. In such a case, a "condition-satisfying user generation notice start request" is issued to the control server 1.

(e) In response, the control server 1 executes the process of the waiting reference request. In processing the waiting reference request, the process waits until the data base is rewritten as a new user logs in and the administration information of the user is rewritten to log-in, or as the arbitration conditions (incoming conditions, for example) are rewritten by a user who has already logged in. In the arbitration process execution unit 14, the personal information of the users registered in the data base is searched again upon receipt of the update notification from the information holding unit 13 when the administration information or the arbitration conditions information, as the case may be, is updated. If a user satisfying the outgoing conditions of the user A can be extracted as a result, the user A is notified.

Without waiting for the information update notification from the information holding unit 13 described above, it is also possible to periodically search the personal information of the users registered in the data base and to extract a user satisfying the arbitration conditions.

In steps (f) to (i), the arbitration process similar to (e) to (h) of the operation example (1) is executed.

In embodying the present invention, various modifications are possible. The foregoing explanation of embodiments refers to the case in which the arbitration-type call establishing system is installed as an interview-for-marriage system at a marriage agency or the like. The invention of course is not limited to such an application but the arbitration-type call establishing system can be configured as a function of the voice call connection in the private branch exchange or the office exchange, for example. It is also apparent that the application of the arbitration-type call establishing system according to the invention is not limited to the interview-for-marriage system. Instead, the invention can find an application as an agency system between sell information and buy information for various commodities held by a multiplicity of users. A method and a storage medium for executing the arbitration-type call connection are also provided according to the present invention.

As described above, according to this invention, a voice call connection reflecting the intention of the two parties for whom the voice call is to be connected can be established by arbitration of the intention of the particular users.

What is claimed is:

1. An arbitration-type call establishing system including a plurality of user systems each having a data communication function and a voice speech function, and a connection control system connected through a data network and a voice communication network to said plurality of user systems;
    said user systems each comprising means for transmitting, to said connection control system through the data network, outgoing conditions for defining parties to which connection requests are to be given, incoming conditions for defining parties from which connection requests are to be permitted, and personal information of a user; and
    said connection control system comprising:
        a reception processing unit for receiving the outgoing conditions, and the incoming conditions, and personal information from said user systems;
        an information holding unit for holding, for each user, user information constituting personal information of the user, and arbitration conditions including said outgoing conditions and said incoming conditions received by said reception processing unit;
        an arbitration processing unit for arbitrating among a combination of users by evaluating whether personal information of the users satisfy arbitration conditions in order to identify candidate users matched for communications, said arbitration conditions being based on outgoing conditions and incoming conditions of users; and
        a connection execution unit for establishing, through the voice communication network, a voice communication call between the user systems of the matched users established by the arbitration in the arbitration processing unit.

2. The arbitration-type call establishing system according to claim 1, wherein said reception processing unit includes information updating means for updating said user information or said arbitration conditions information in said information holding unit based on change control information input from said user systems through said data network.

3. The arbitration-type call establishing system according to claim 1, wherein said user systems each include:
    means for transmitting a reference request indicating said outgoing conditions to said connection control system,
    displaying means for displaying the user information of one of more conditions-satisfying users notified by said connection control system in response to said reference request; and
    selecting means for selecting the desired other party out of said displayed condition-satisfying users and notifying said connection control system of the selected party through said data network;
    said connection control system including:
        searching means for searching for a user satisfying the outgoing conditions in response to the reference request from a transmitting user systems based on said user information in said information holding unit; and
        notification means for notifying the transmitting user system, through said data network, of the user information of the condition-satisfying user searched for by said searching means; and
        said arbitration processing unit performing the arbitration process with the condition-satisfying users selected from said transmitting user systems and notified.

4. The arbitration-type call establishing system according to claim 3, wherein said selecting means transmits to said connection control system a voice communication call establishing request for establishing a voice communication call to a party it is desired to have a conversation with among the condition-satisfying users notified.

5. The arbitration-type call establishing system according to claim 3, wherein said selecting means transmits to said connection control system a request to inquire for permission to form a voice communication call to one or more parties it is desired to have a conversation with among the condition-satisfying users notified.

6. The arbitration-type call establishing system according to claim 3, wherein said arbitration processing unit arbitrates between the advisability of forming a voice communication call with reference to the incoming conditions of said condition-satisfying users selected as the desired other party by said user system, based on the select information of said condition-satisfying users.

7. The arbitration-type call establishing system according to claim 3, wherein said arbitration processing unit searches for only those users satisfying the incoming conditions as condition-satisfying users by said searching means with reference to the user incoming conditions and notifies said transmitting user system.

8. The arbitration-type call establishing system according to claim 3, wherein said arbitration processing unit requests said selected condition-satisfying users to permit the connection in response to the notification of the select information of the condition-satisfying users supplied from transmitting user systems and further arbitrates only with the users who have answered "acceptable".

9. The arbitration-type call establishing system according to claim 8, wherein said arbitration processing unit submits the user information of said transmitting user to the selected condition-satisfying users when requesting the permission for connection.

10. The arbitration-type call establishing system according to claim 8, wherein said arbitration processing unit submits the user information of the transmitting user only to the selected condition-satisfying users who are confirmed to be willing to respond when requesting permission to be connected.

11. The arbitration-type call establishing system according to claim 8, wherein said arbitration processing unit notifies the transmitting user that the selected condition-satisfying users willing to respond when requesting the request for connection, and submits the user information of the transmitting user only to the selected ones of the condition-satisfying users willing to respond.

12. The arbitration-type call establishing system according to claim 1, wherein said arbitration processing unit arbitrates with the users having the arbitration conditions coinciding with those of the transmitting user, periodically or at time of updating the information of said information holding unit, based on the request from the transmitting user who has registered the outgoing conditions.

13. A connection control system in an arbitration-type call establishing system including a plurality of user systems each having a data communication function and a voice speech function, and the connection control system connected through a data network and a voice communication network to said plurality of said user systems, said connection control system comprising:

a reception processing unit for receiving for each user outgoing conditions for defining parties to which connection requests are to be given, incoming conditions for defining parties from which connection requests are to be permitted and personal information for each user;

an information holding unit for holding, for each user, user information constituting the personal information of the user, and arbitration conditions including said outgoing conditions and said incoming conditions received by said reception processing unit, and an arbitration processing unit for arbitrating among a combination of users having personal information satisfying said arbitration conditions to identify a candidate match for communications;

wherein an instruction is given to form, through the voice communication network, a voice communication call between the user systems of the matched users established by the arbitration in said arbitration processing unit.

14. The connection control system according to claim 13, wherein said reception processing unit includes information updating means for updating said user information or said arbitration conditions information of said information holding unit based on change control information input from said user systems through said data network.

15. The connection control system according to claim 13, comprising:

searching means for searching for a user satisfying the outgoing conditions in response to the reference requests indicating the outgoing conditions from transmitting user systems; and notification means for notifying said transmitting user systems, through said data network, of the user information of the condition-satisfying users searched for by said searching means;

said arbitration processing unit performing the arbitration process with the condition-satisfying users selected and notified as desired parties from the transmitting user systems.

16. The connection control system according to claim 15, wherein said arbitration processing unit arbitrates between the advisability of forming a voice communication call with reference to the incoming conditions of said condition-satisfying user selected as the desired other party by said user system, based on the select information of the condition-satisfying user.

17. The connection control system according to claim 13, wherein said arbitration processing unit searches for only those users satisfying the incoming conditions as condition-satisfying users by said searching means with reference to the user incoming conditions and notifies said transmitting user system.

18. The connection control system according to claim 15, wherein said arbitration processing unit requests said selected condition-satisfying users to permit the connection in response to the notification of the select information of the condition-satisfying users supplied from the transmitting user system and further arbitrates only with the users who have answered "acceptable".

19. The connection control system according to claim 18, wherein said arbitration processing unit submits the user information of said transmitting user to the selected condition-satisfying users when requesting permission for connection.

20. The connection control system according to claim 18, wherein said arbitration processing unit submits the user information of the transmitting user only to the selected condition-satisfying users who are confirmed to be willing to respond when requesting the permission for connection.

21. The connection control system according to claim 18, wherein said arbitration processing unit notifies the transmitting user that the selected condition-satisfying users are willing to respond when requesting the request for connection, and submits the user information of the transmitting user only to the selected ones of the condition-satisfying users who are willing to respond.

22. An arbitration-type call establishing method in a system including a plurality of user systems each having a data communication function and a voice speech function, and a connection control system connected through a data network and a voice communication network to said plurality of the user systems;

wherein in each of said user systems, the method comprises the step of transmitting, to said connection control system through the data network by each user system, outgoing conditions for defining parties to which connection requests are to be given, incoming conditions for defining parties from which connection requests are to be permitted, and personal information of the user; and in said connection control system, the method comprises the steps of:

receiving the outgoing conditions, the incoming conditions and the user information constituting personal information of the user from said user systems to a reception processing unit;

holding, in an information holding unit, for each user, user information constituting personal information of the user, and arbitration conditions including said outgoing conditions and said incoming conditions received by said reception processing unit;

arbitrating, in an arbitration processing unit, among a combination of users satisfying said arbitration conditions with reference to said personal user information to identify a candidate match for communications, and establishing, in a connection execution unit, through the voice communication unit, a voice communication call between the user systems of the matched users established by the arbitration in the arbitration processing unit.

23. The method according to claim 22, further comprising a step a of updating, in said reception processing unit, said user information or said arbitration conditions information in said information holding unit base on change control information input from said user systems through said data network.

24. The method according to claim 22, wherein the method further comprises the steps of:
transmitting a reference request indicating said outgoing conditions from each of said user systems to said connection control system,
displaying, in each of said user systems, the user information of one or more condition-satisfying users notified by said connection control system in response to said reference request; and
selecting, in each of said user systems, the desired other party out of said displayed condition-satisfying users and notifying said connection control system of the selected party through said data network;
searching, in said connection control system, for a user satisfying the outgoing conditions in response to the reference requests from a transmitting user system based on said user information in said information holding unit; and
notifying from said connection control system to the transmitting user system, through said data network, of the user information of the condition-satisfying user searched for by said searching means; and
said arbitration processing unit performing the arbitration process with the condition-satisfying users selected from said transmitting user systems and notified.

25. The method according to claim 24, wherein said selecting means transmits to said connection control system a voice communication call establishing request for establishing a voice communication call to a party it is desired to have a communication with among the condition-satisfying users notified.

26. The method according to claim 24, wherein said selecting means transmits to said connection control system a request to inquire for the permission of forming a voice communication call to one or more parties it is desired to have a conversation with among the condition-satisfying users notified.

27. The method according to claim 24, wherein said arbitration processing unit arbitrates the advisability of forming a voice communication call with reference to the incoming conditions of said condition-satisfying user selected as the desired other party by said user system, based on the select information of said condition-satisfying user.

28. The method according to claim 24, wherein said arbitration processing unit searches for only those users satisfying the incoming conditions as condition-satisfying users by said searching means with reference to the user incoming conditions and notifies said transmitting user system.

29. The method according to claim 24, wherein said arbitration processing unit requests said selected condition-satisfying users to permit the connection in response to the notification of the select information of the condition-satisfying users supplied from transmitting user systems and further arbitrates only with the users who have answered "acceptable".

30. The method according to claim 29, wherein said arbitration processing unit submits the user information of said transmitting user to the selected condition-satisfying users when requesting the permission for connection.

31. The method according to claim 29, wherein said arbitration processing unit submits the user information of the transmitting user only to the selected condition-satisfying users who are confirmed to have the willingness to respond when requesting the permission for connection.

32. The method according to claim 29, wherein said arbitration processing unit notifies the transmitting user that the selected condition-satisfying users have the willingness to respond when requesting the request for connection, and submits the user information of the transmitting user only to the selected ones of the condition-satisfying users willing to respond.

33. The method according to claim 22, wherein said arbitration processing unit arbitrates between the users having the arbitration conditions coinciding with those of the transmitting user, periodically or at a time of updating the information of said information holding unit, based on the request from the transmitting user who has registered the outgoing conditions.

34. A storage medium for storing a program for executing an arbitration-type call connecting method in a system including a plurality of user systems each having a data communication function and a voice speech function, and a connection control system connected through a data network and a voice communication network to said plurality of the user systems;
in said connection control system, the method comprising the steps of:
receiving outgoing conditions, the incoming conditions and personal information of a user for each user system to a reception processing unit;
holding, in an information holding unit, user information constituting personal information of the user, and arbitration conditions including said outgoing conditions and said incoming conditions received by said reception processing unit;
arbitrating, in an arbitration processing unit, among a combination of users satisfying said arbitration conditions with reference to said personal user information to identify a candidate match for communications; and
establishing, in a connection execution unit, through the voice communication network, a voice communication call between the user systems of the matched users established by the arbitration in the arbitration processing unit.

* * * * *